United States Patent [19]
Gübitz et al.

[11] Patent Number: 5,695,638
[45] Date of Patent: Dec. 9, 1997

[54] LIQUID FILTER

[75] Inventors: Franz Gübitz, Kelkheim; Gunther Reitzel, Trebur, both of Germany

[73] Assignee: Hoechst Aktiengesellschaft, Germany

[21] Appl. No.: 600,479

[22] Filed: Feb. 13, 1996

Related U.S. Application Data

[63] Continuation of Ser. No. 360,271, Dec. 21, 1994, abandoned.

[30] Foreign Application Priority Data

Dec. 30, 1993 [DE] Germany .................. 43 44 983.2

[51] Int. Cl.⁶ .................................................. B01D 27/08
[52] U.S. Cl. ............... 210/416.4; 210/232; 210/116.5; 210/496; 210/510.1
[58] Field of Search ................... 210/168, 232, 210/416.4, 416.5, 446, 496, 500.1, 510.1

[56] References Cited

U.S. PATENT DOCUMENTS

| | | | |
|---|---|---|---|
| 4,250,039 | 2/1981 | Cozzi et al. | 210/416.5 |
| 4,305,416 | 12/1981 | Henning et al. | 137/38 |
| 4,420,396 | 12/1983 | Yamamoto et al. | 210/416.4 |
| 4,992,166 | 2/1991 | Lowsky et al. | 210/232 |
| 5,182,015 | 1/1993 | Lee | 210/232 |
| 5,256,284 | 10/1993 | Lee | 210/232 |
| 5,336,405 | 8/1994 | Tang et al. | 210/232 |
| 5,375,629 | 12/1994 | Wilson | 139/383 R |
| 5,378,358 | 1/1995 | Park | 210/187 |

FOREIGN PATENT DOCUMENTS

| | | |
|---|---|---|
| 0 217 482 | 8/1987 | European Pat. Off. |
| 0 559 011 A1 | 9/1993 | European Pat. Off. |
| 2 255 933 | 7/1975 | France . |
| 35 37 794 A1 | 5/1986 | Germany . |

*Primary Examiner*—Neil McCarthy
*Assistant Examiner*—Theodore M. Green
*Attorney, Agent, or Firm*—Connolly & Hutz

[57] ABSTRACT

A liquid filter for purifying mineral oil, the components of which are composed of a thermoplastic polymer, preferably polyacetal, is produced by welding the individual parts. Since no foreign materials are present, the filter can be subjected to a recycling process easily and without problem.

4 Claims, 2 Drawing Sheets

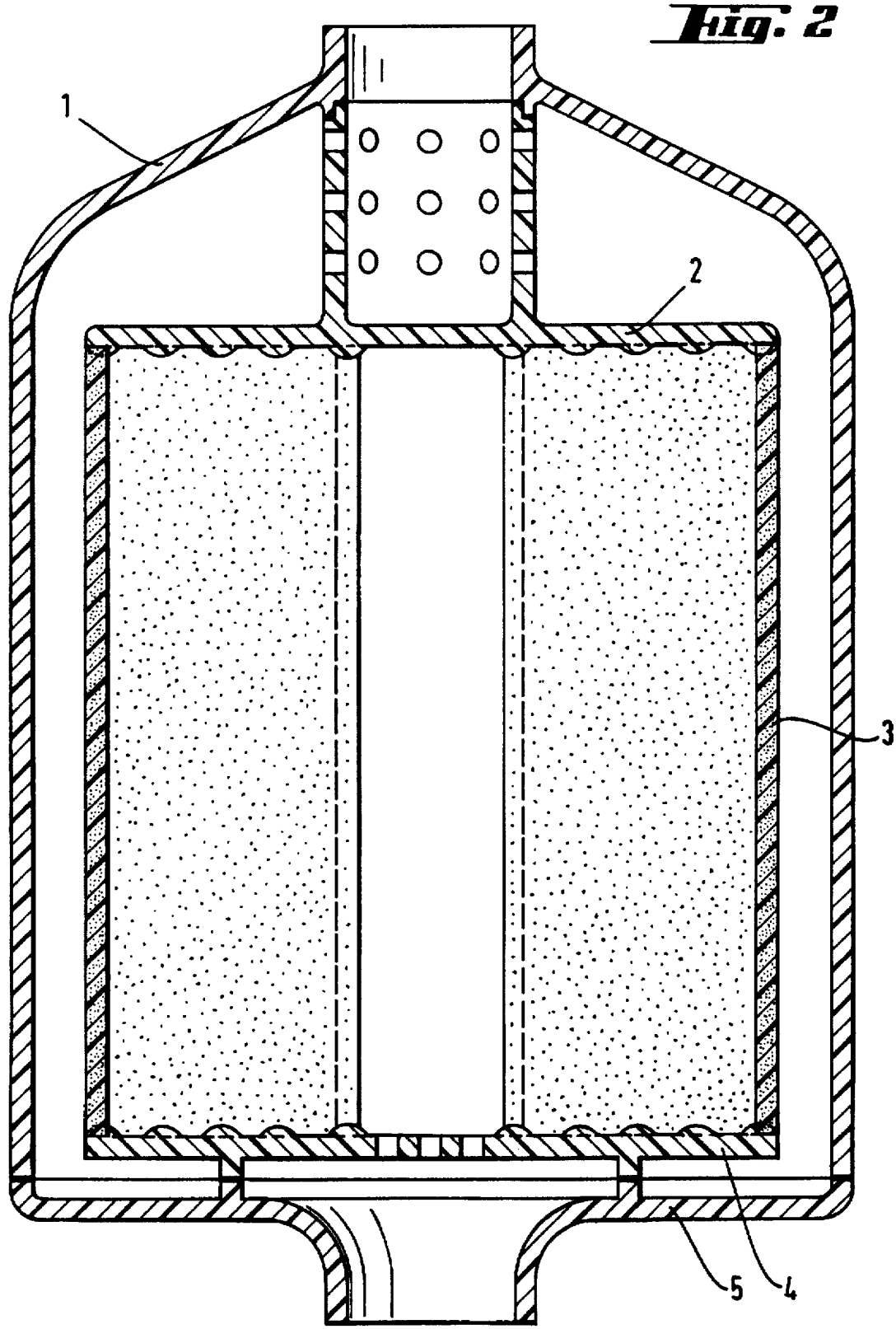

LIQUID FILTER

This application is a continuation of application Ser. No. 08/360,271, filed on Dec. 21, 1994, abandoned.

The invention relates to a filter for purifying mineral oil, e.g. fuels and heating oil, in which the components, e.g. the filter material, housing, support bodies and connectors are made from a thermoplastic polymer and in which the connections between filter and housing and, if appropriate, support bodies are produced by welding.

Pressure-generating elements of the motor vehicle injection pump and injection nozzles are matched to each other with an accuracy of a few thousandths of a millimeter. This means that impurities in the fuel which attain this size promote wear or can endanger the function of the finely machined parts. Poor filtration can therefore lead to damage to pump pistons, pressure valves and injection nozzles. Consequences of high wear are:

unfavorable combustion
high fuel consumption
smoke formation
poor starting
uneven idling
reduced engine power Purification of the fuel is therefore of great importance and must be performed by special filters adapted to the requirements of the injection pump. Depending on the manner of use, a distinction is therefore made between simple filters, step filters and parallel filters, each with or without a water reservoir.

Units in which a fine-pore filter (mean pore size, depending on engine design, approximately 5 to 15 μm) is arranged in a housing are particularly widespread. The filter is conventionally composed of special paper which is wound in a spiral shape or folded in a star shape as a pocket and is arranged over support bodies in the housing. The housing material generally used is metal or a thermoplastic polymer.

For complete separation of the dirty side from the clean side of the filter insert, this must be sealed off from the housing. This is generally achieved with special adhesives, occasionally in combination with seals made of fuel-resistant elastomers. Likewise, for sealing between housing and housing cover, the use of an elastomer seal is generally required. Introduction of the adhesive and the curing time represent considerable cost factors, just as does the use of seals made of fuel-resistant elastomers. After a certain service life, this filter type is exchanged as a whole.

Other types of fuel filters operate with so-called filter inserts. These are designs in which the filter made of felt or paper is arranged between an inner and outer perforated metal support body and this support body is closed at the top and bottom by covers. Appropriate seals and/or glues must also be employed with filter inserts of this type in order to separate strictly the clean side from the dirty side. This unit is then introduced into a housing, the upper and lower parts of which are joined together by a threaded joint. After an appropriate service life, the threaded joint is taken apart and only the filter insert is exchanged.

All filter designs previously used have the disadvantage that they are composed of a plurality of different materials and thus virtually cannot be recycled as a whole. In the context of sparing resources, designs are currently being studied in which, by dismantling the waste parts of the used filters, separation into metallic and nonmetallic portions is achieved. The metal batches can be reprocessed by known processes. However, the nonmetallic batches of dismantled material are mixtures of filter paper, felt, adhesives and elastomers which can virtually only be disposed of by landfilling or incineration.

The object was therefore to avoid the disadvantages described.

The invention relates to a liquid filter for purifying mineral oil in which all components are composed of a thermoplastic polymer.

Components for the filter according to the invention are, by definition, housing, filter material, support bodies and connectors.

The thermoplastic polymer used, which obviously must be mineral oil-resistant, is preferably polyacetal (POM), i.e. oxymethylene homopolymers and oxymethylene copolymers which preferably contain oxyethylene units as co-structural units, and terpolymers. All polymers which contain over 50% of the repeating units ($CH_2O$) are herewith included. Polyacetal is known for the production of precisely fitting moldings.

It is important in the filter according to the invention that all components are made up of the same polymer so that these can be more easily reprocessed in a possible recycling process and the use of adhesives and elastomer seals is avoided. Just this type of single-type waste polyacetal can be reprocessed faultlessly and without problem. Thus both production and possible disposal are particularly inexpensive.

Production of the solid moldings which are required for the assembly of the filter takes place in advance by injection-molding in separate operations. For the production of the filter material, which is generally a "nonwoven" material (nonwoven web or felt), the production processes which are conventional and known for the production of nonwoven webs from thermoplastics can be used. Depending on the desired pore size, flowrate and filter thickness, aftertreatment of the web can be performed, e.g., by needling, calandaring, and short-time heating.

The join between the components of the filter according to the invention, in which components a liquid-tight joint must be provided, e.g. between filter material, filter base and filter cover (in the case of so-called filter inserts) and filter material, filter support bodies and housing, is made by welding. In principle, all welding processes developed for thermoplastics are suitable; the heating element welding process is preferably used.

Welding a solid part to a "non solid part" (nonwoven web, foam) produced from the same material can generally only be effected with great difficulty since the heat capacity of such parts is very different. In the case of simultaneous and/or the same type of heating of, e.g., filter material (nonwoven web) and filter cover (solid part), because of the very low wall thicknesses present in the nonwoven web, the material is very quickly melted. The consequence is a collapse of the fiber network with a considerable reduction of the volume previously occupied by the nonwoven web structure. The contraction in volume, in connection with the relatively low stiffness of the nonwoven web, makes welding of the filter to the filter cover heated in parallel to this part extremely difficult, since the comparatively considerably higher wall thickness of the solid part requires substantially greater amounts of heat for melting.

In the filter according to the invention, the side of the solid part facing the filter material is furnished with raised structures (ribs, hobs, ridges or the like). After heating thereof to temperatures above the melting point of the thermoplastic polymer, these plasticized structures are joined to the unheated filter material. The plasticized material of the solid part partially penetrates into the nonwoven web structure of the filter material, heats the fibers in the boundary zones to above the melting point and thus leads to a true welding. In tensile tests, breakages generally occurred in the nonwoven web region and not at the weld zones.

The filter according to the invention is suitable for purifying mineral oil, preferably fuels and heating oil, but other liquids of inorganic or organic nature can also be freed of impurities by use of the filter.

BRIEF DESCRIPTION OF THE DRAWINGS

Novel features and advantages of the present invention will become apparent to those skilled in the art from a reading of the following detailed description in conjunction with the accompanying drawings wherein:

FIG. 2 is a sectional view similar to FIG. 1 but illustrating the liquid filter assembly in its assembled form, according to the present invention.

Figure 1:
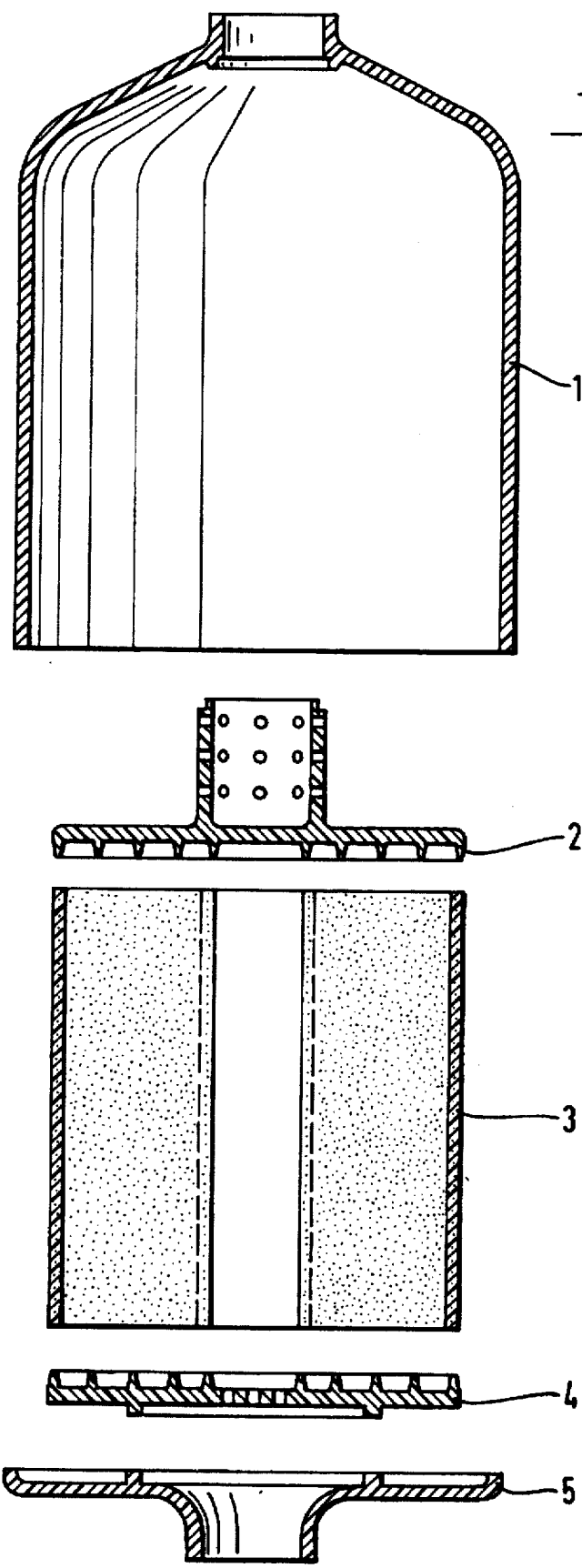
FIG. 1 is an exploded sectional view of a liquid filter assembly, according to the present invention.

The liquid filter generally comprises the following components (see FIGS. 1 and 2).

1. Housing
2. Filter cover
3. Filter material composed of POM nonwoven web
4. Filter base
5. Housing cover and, if appropriate, other functional parts, e.g. water separators or attachment elements, which are additional in certain applications.

In the production of the filter, the radially running ribs of the filter cover (2) and filter base (4) are plasticized by heating and then joined under moderate pressure (0.2N/mm$^2$) to the filter (3) produced from POM nonwoven web by coiling. This filter body is mounted in the housing (1) via a centering means which is integrated in the housing. The join to the housing cover (5) is performed by welding filter base and housing cover. Housing (1) and housing cover are likewise joined together by welding.

The liquid to be filtered enters the inlet at the top of the housing 1 and passes into the outer space inside the housing 1. The liquid passes through the filter material 3, which is welded between the filter cover 2 and filter base 4. The liquid enters the filter material 3 from the regions near the wall of the housing 1 and collects in a channel in the middle of the filter material 3. At the end of this channel the liquid passes the openings (or holes) in the center of the filter base and leaves the filter assembly through the outlet in the housing cover 5.

We claim:

1. A liquid filter assembly comprising a filter housing with an inlet opening therein for liquid to be filtered, a housing cover with an outlet opening therein for filtered liquid, nonwoven filter material positioned within the housing, support means with raised structure within the housing supportingly engaging the nonwoven filter material, and welds at the raised structure of the support means connecting the filter material to the support means, and wherein the filter housing, the filter cover, the nonwoven filter material, and the support means for the nonwoven material are composed of the same thermoplastic polymer.

2. A liquid filter assembly as in claim 1 wherein the thermoplastic polymer is polyacetal.

3. A liquid filter assembly as in claim 1 wherein the support means for the filter material has raised structure in the form of ribs, knobs or ridges facing and engaging the filter material.

4. A liquid filter assembly as in claim 1 wherein the filter housing and the housing cover are connected together by welds.

* * * * *